United States Patent [19]

Iijima

[11] Patent Number: 4,949,240
[45] Date of Patent: Aug. 14, 1990

[54] DATA STORAGE SYSTEM HAVING CIRCUITRY FOR DIVIDING RECEIVED DATA INTO SEQUENTIAL WARDS EACH STORED IN STORAGE REGION IDENTIFIED BY CHAIN DATA

[75] Inventor: Yasuo Iijima, Yokohama, Japan

[73] Assignee: Kabushiki Kaisha Toshiba, Kawasaki, Japan

[21] Appl. No.: 164,961

[22] Filed: Mar. 7, 1988

[30] Foreign Application Priority Data

| Mar. 13, 1987 [JP] | Japan | 62-56742 |
| Mar. 13, 1987 [JP] | Japan | 62-58105 |
| Mar. 13, 1987 [JP] | Japan | 62-58106 |

[51] Int. Cl.$^5$ .............. G06F 12/04; G06F 13/14; G06F 13/37; G06F 15/415
[52] U.S. Cl. ................. 364/200; 364/24.55; 364/245.9; 364/246.2; 364/246.3; 364/251; 364/252.6; 364/251.5; 364/254.6; 364/258.3; 364/259.8; 364/260; 235/380; 235/487
[58] Field of Search ... 364/200 MS File, 900 MS File; 335/380, 487

[56] References Cited

U.S. PATENT DOCUMENTS

| 3,821,708 | 6/1974 | Sokoloff | 364/200 |
| 3,900,834 | 8/1975 | Casey et al. | 364/200 |
| 4,216,528 | 8/1980 | Robertson | 364/200 |
| 4,631,666 | 12/1986 | Harris et al. | 364/200 |
| 4,734,568 | 3/1988 | Watanabe | 235/380 |
| 4,755,660 | 7/1988 | Nakano | 235/380 |
| 4,785,393 | 11/1988 | Chu et al. | 364/200 |
| 4,797,543 | 1/1989 | Watanabe | 235/492 |
| 4,800,520 | 1/1989 | Iijima | 235/380 |

Primary Examiner—Archie E. Williams, Jr.
Assistant Examiner—Emily Y. Chan
Attorney, Agent, or Firm—Cushman, Darby & Cushman

[57] ABSTRACT

A control element incorporated in an IC card divides externally input data into a plurality of words. It adds a word-discriminating data item and a chain data item to each of these words, and writes these words into the data memory incorporated in the IC card. Each chain data item indicates the storage location within the data memory where the word next to the word to which the chain data item has been added is stored. Each word-discriminating data item indicates whether or not the data with the word-discriminating data item added thereto is the first of the words forming the externally input data. The control element adds, to the first word, a word-discriminating data item whose most significant bit is "O", and adds a chain data item, whose value is also "O", to a word when the next word thereto is the last word. In addition the control element holds the data items, which indicate the storage locations of the words, while the words are being stored in the data memory, adding these data items, as chain data items, to the words when all of the words have been correctly written into the data memory.

20 Claims, 6 Drawing Sheets

| WORD NUMBER | WORD-DISCRIMINATING DATA | CHAIN DATA | DATA |
|---|---|---|---|
| 1 | 0XXXXXXX | 2 | W11 |
| 2 | 1XXXXXXX | 3 | W12 |
| 3 | 1XXXXXXX | 0 | W13 |
| 4 | 0XXXXXXX | 5 | W21 |
| 5 | 1XXXXXXX | 0 | W22 |
| 6 | 0XXXXXXX | 7 | W31 |
| 7 | 1XXXXXXX | 8 | W32 |
| 8 | 1XXXXXXX | 0 | W33 |
| 9 | 0XXXXXXX | 0 | W4 |

DATA STORAGE SYSTEM HAVING CIRCUITRY FOR DIVIDING RECEIVED DATA INTO SEQUENTIAL WARDS EACH STORED IN STORAGE REGION IDENTIFIED BY CHAIN DATA

BACKGROUND OF THE INVENTION

1. Field of the Invention

The present invention relates to a portable data-recording medium, generally known as an "IC card", which contains an IC chip having, for example, a non-volatile data memory and a control element such as a CPU, and more particularly, to a system for storing data in the data memory.

2. Description of the related art including information disclosed under §§1.97-1.99.

The so-called "IC card" was developed recently and contains an IC chip having a non-volatile data memory and a control element such as a CPU. The control element controls access to the data memory, storing data in and reading it out from the data memory, in accordance with a command input via an external terminal device. The storage area of the data memory is divided into a plurality of smaller areas, any of which can be accessed, as required, by the control element.

In the data memory of the conventional IC card, items of data are sequentially stored in the order in which they will be accessed. To replace one of the data items stored in the memory with an other data item, it is necessary for the other data item to be the same length as the data item already stored therein. If the data item being replaced is of greater length than the replacement data item, memory elements capable of storing several bytes (or several words) will remain unused after the replacement data item has been stored. Conversely, if the data item being replaced is shorter in length than the replacement data item, the next data item stored in the memory must be shifted within the memory to ensure that the replacement data item does not overflow.

In order to reduce the number of unused memory elements to a minimum, and to prevent the overflowing of data items, each data item is divided into a plurality of words, thus forming a chain of words, to which so-called chain data is added, one chain data item to each word. By storing these words sequentially in the data memory, there is much less probability that some memory elements will remain unused, or that a newly-entered data item will overflow.

In order to distinguish one word chain (or data item) from any other word chains (or other data items), it is necessary for the first and last word of each word chain to be clearly identifiable. (However, there is, as yet, no known data storing system which is capable of identifying the first or last word of a word chain.)

A chain data item is added to each word as the word chain is stored in the data memory. If, as a result of some external disturbance, the power supply to the IC card is cut off before all the necessary word chain (or data item) have been stored in the data memory, one of the chain data items added to word chains is cut. Consequently, if the control element of the IC card later accesses the memory, in order to read out the word to which the incomplete chain data is added, another, different, word may erroneously be read out from the data memory.

SUMMARY OF THE INVENTION

Accordingly, it is an object of the present invention to provide a data storing system which makes it possible to readily identify the first and last words forming a chain, each word linked to another by a chain data item.

Another object of the present invention is to provide a data storing system wherein a chain data item is not added to any word rendered incomplete as a result of the power supply to the system being accidentally interrupted, with the result that such a word becomes invalid and therefore cannot be read out from its storage area after the power supply to the system has been restored.

A data storing system according to the present invention comprises: a data storing medium; data-dividing means for dividing data into a plurality of words; and control means for storing the words, and adding chain data items to the words, each of the chain data items indicating the storage location of the word next to the word to which the chain data item is added, and said chain data item having a specified value if the word to which the chain data item is added is one end of the words forming the data.

DETAILED DESCRIPTION OF THE PREFERRED EMBODIMENT

An embodiment of this invention will now be described, with reference to the accompanying drawings.

Figure 1:
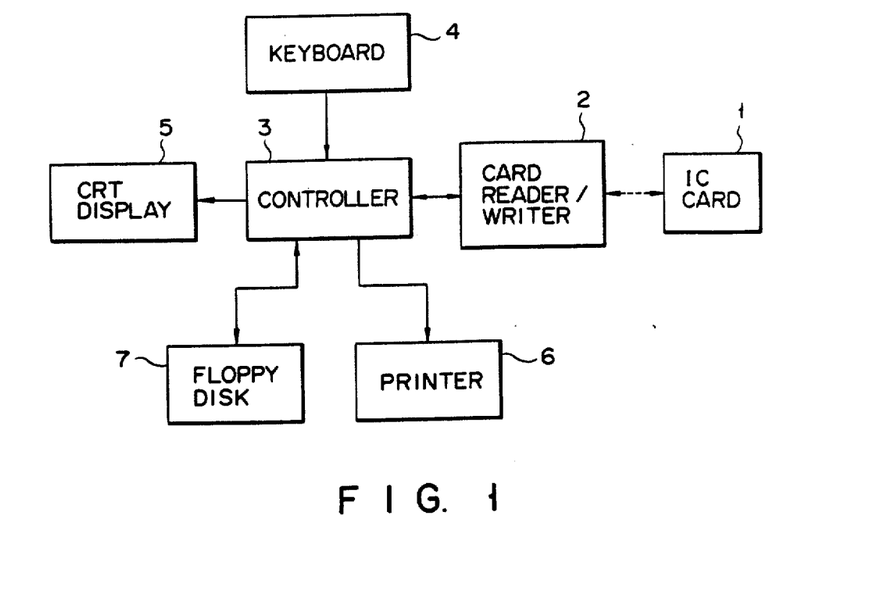
FIG. 1 is a block diagram showing a terminal device.

FIG. 1 shows a terminal device into which IC card 1 incorporating the data storing system according to the invention is inserted when it is to be used. The terminal device is designed for use in a financial or shopping system, and comprises card reader/writer 2, control section 3, keyboard 4, CRT display 5, printer 6, and floppy disk drive 7. IC card 1 is inserted into card reader/writer 2. Card reader/writer 2 is coupled to control section 3, which includes a CPU and the like.

Figure 2:
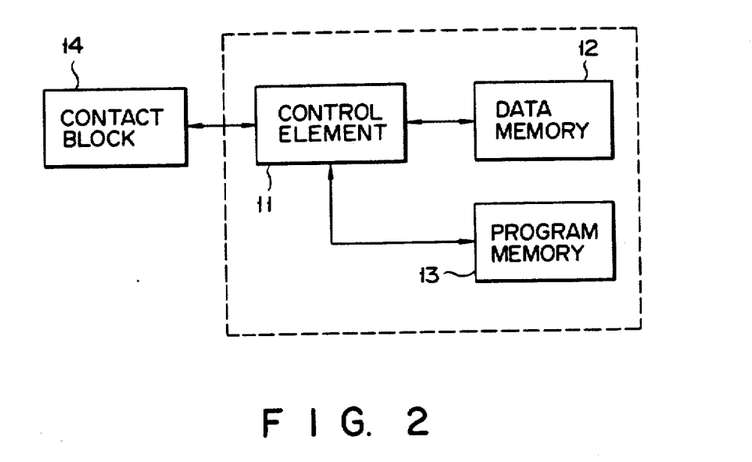
FIG. 2 is a block diagram showing an IC card which incorporates the data storing system according to the invention.

FIG. 2 shows the structure of IC card 1. As can be seen, IC card 1 comprises control element 11 (e.g., a CPU), data memory 12, program memory 13, and contact block 14. Data memory 12 is a non-volatile memory. Program memory 13 is, for example, a mask ROM, and stores a program for controlling control element 11. More specifically, it can be an EEPROM. Contact block 14 can be electrically connected with card reader/writer 2 of the terminal device (FIG. 1). The components illustrated within the rectangle (indicated by broken lines), i.e., control element 11, data memory 12, and program memory 13, are incorporated in a single IC chip which is embedded within the body of IC card 1.

Figure 3:
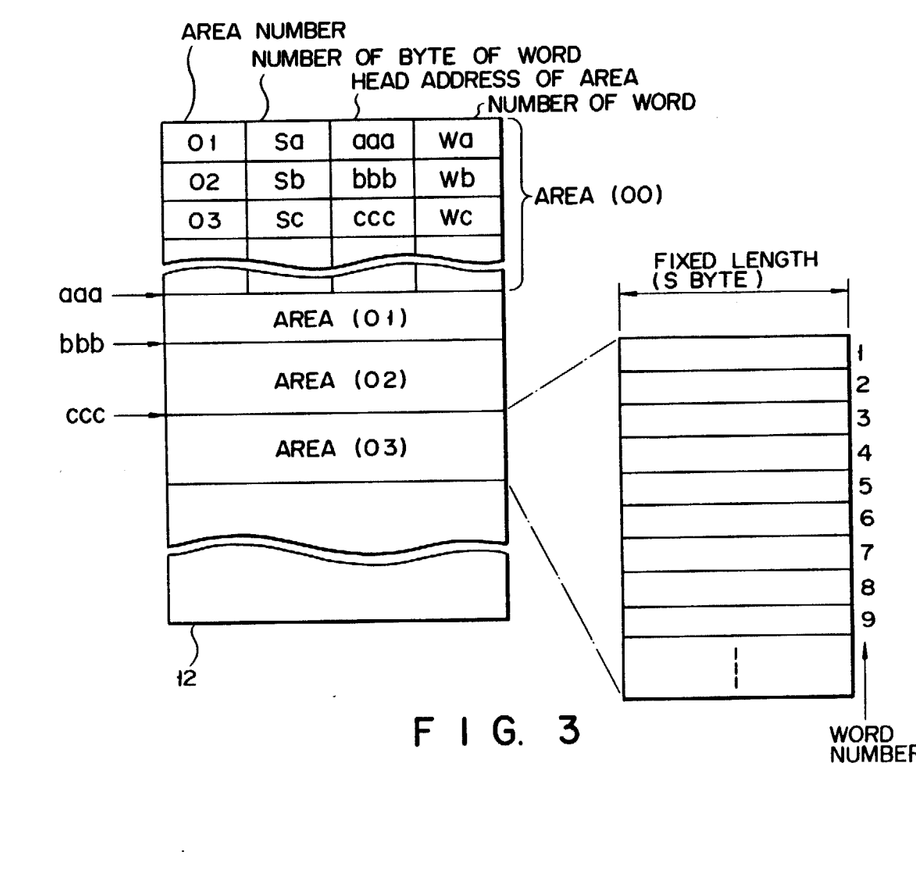
FIG. 3 shows the memory map of the data memory incorporated in the IC card shown in FIG. 2.

As is shown in FIG. 3, the storage section of data memory 12 is divided into storage areas [00], [01], [02], [03], . . . . Various items of data are stored in storage area [00]. More these data items are: the area numbers of storage areas [01], [02], [03], . . . , head addresses of these storage areas, the numbers of words, each specifying the number of words stored in a storage area, and the numbers of bytes, each representing the number of bytes forming each word. For instance, the area number "01", the head address "aaa", the number of words "Wa", and the number of bytes "Sa"—all of which relate to storage area [01]—are stored in storage area [00]. Each storage area, except for area [00], is divided into words of a fixed length (S bytes). Numbers are assigned to these words. These word numbers are of hexadecimal. Number "1" is assigned to the first words, and the word number assigned to each successive word is greater by one than that of the immediately preceding word.

Figure 4:
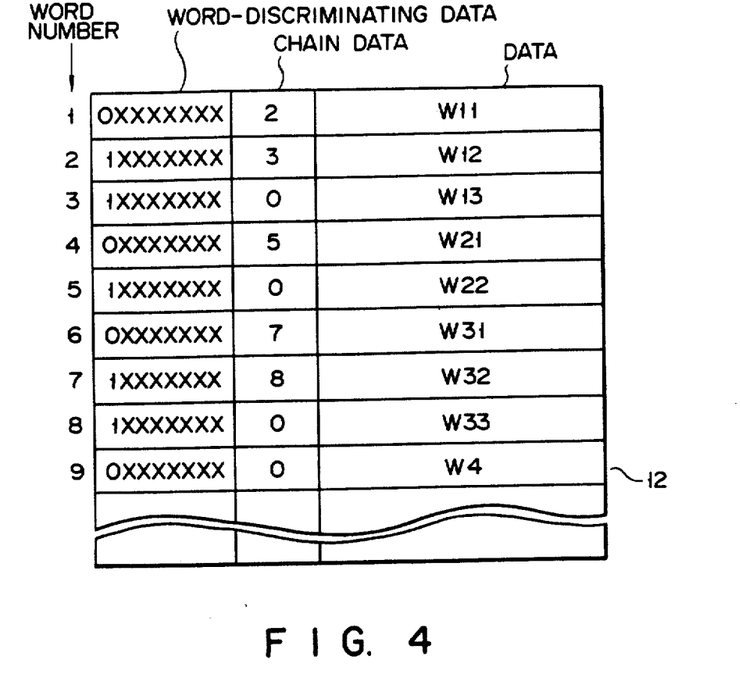
FIG. 4 schematically illustrates data stored in a storage area of the data memory.
Figure 5:
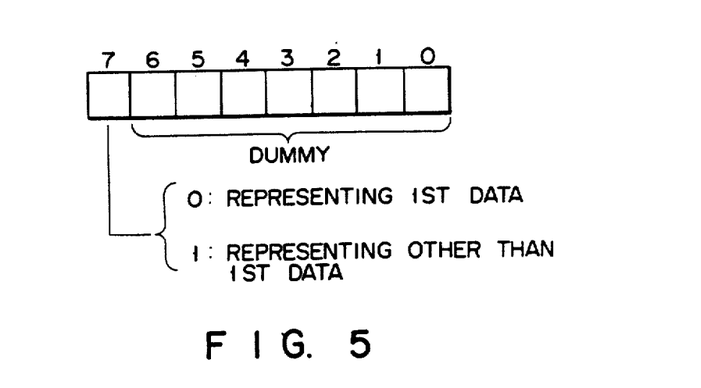
FIG. 5 is a schematic diagram showing ID data.

FIG. 4 schematically illustrates the data stored in one of the storage areas [01], [02], [03], . . . As is shown in this figure, chain data and word-discriminating data are added to each word stored in this storage area. The chain data is followed by the word, and specifies the storage location of the word. The word discrimination data is, for example, one-byte (i.e., 8-bit) of data, as is shown in FIG. 5, and indicates whether or not the first of the words forming a chain stored in the storage area. More precisely, it is the MSB (most significant bit) of the word-discriminating data which, when it is "0", indicates that the word is the first one, and which, when it is "1", indicates that it is not.

Figure 6:
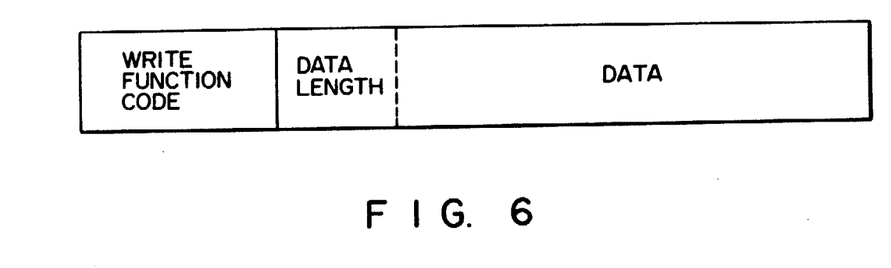
FIG. 6 shows the format of write instruction data.

The data storing system according to the present invention will now be explained in detail. To write a data item into the data memory, write instruction data having the format shown in FIG. 6 is input from card reader/writer 2 to IC card 1. Upon recognizing the write function code contained in the instruction data, control element 11 of IC card 1 performs the sequence of operations shown in the flow chart of FIG. 7.

Figure 7:
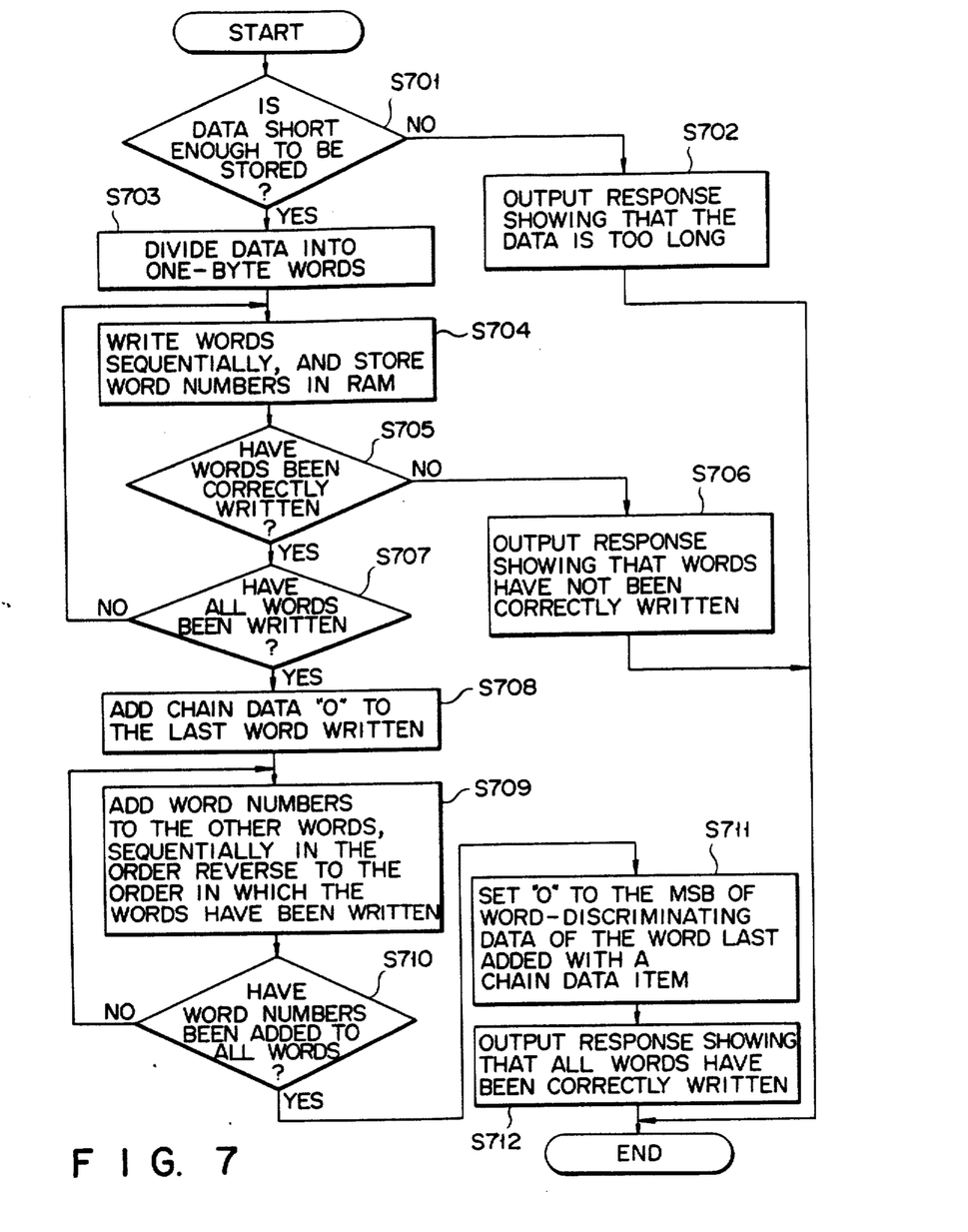
FIG. 7 is a flow chart explaining how data is written into the data memory.

More specifically, in step S701, control element 11 first determines the number of bytes making up the data item, from the data contained in the write instruction data and indicating the length of the data item, and then, determines whether or not the data item is short enough to be stored in the relevant storage area of data memory 12. If NO, control element 11 outputs response data, in step S702, indicating that the data item consists of too many bytes.

If YES in step S701, control element 11 divides the data item into S-bytes words, in step S703. Then, in step S704, these S-bytes words are written, one after another, into the relevant storage area of data memory 12, while the serial numbers specifying the words thus written into the storage area are temporarily stored in the RAM (not shown) built into control element 11. In the next step, S705, control element 11 determines whether or not the data item, i.e., the S-bytes words, has been correctly written into data memory 12. If NO, element 11 outputs, in step S706, response data showing that an error has occurred during the writing of the data item.

If YES in step S705, the word numbers stored in the RAM are added, as chain data items, to the words written into the specified storage area of data memory 12. More specifically, chain data item "0" is first added to the last of these words, in step S708, thereby identifying this word as the last one of the words forming a chain. The serial word numbers, other than "0", are then added, in step S709, to the remaining words of the chain. In other words, the word numbers, "1", "2", "3", . . . are added to the other words, in reverse order to that in which they were stored in the RAM. Then, in step S710, control element 11 determines whether or not all the chain data items, i.e., all the word numbers, have been added to the respective words. If YES, element 11 sets "0" to the MSB of the word-discriminating data assigned to the word to which the last chain data item has been added, in step S711. Then, in step S712, control element 11 outputs response data which indicates that the data item has been correctly written into the desired storage area of data memory 12. Thus, the writing of the data item is completed.

The writing of a data item into data memory 12 will now be explained in detail, with reference to FIG. 4. In the instance shown in FIG. 4, the data item making up record 1 is divided into three words W11, W12, and W13, and word numbers 1, 2, and 3 are respectively assigned thereto. Then, words W11, W12, and W13 are written into data memory 12, while simultaneously, word numbers 1, 2, and 3 are sequentially stored in the RAM contained in control element 11. Next, chain data item "0" is added to word W13, chain data item "3" is added to word W12, and chain data item "2" is added to word W11, after which the MSB of the data item which discriminates word W11, (i.e., the last word to which a chain data item has been added) from any other word, is set to "0". After a word-discriminating data item, as well as a chain data item, have been added to each of words W11, W12, and W13, these words are written into the data memory.

As with record 1, the data item making up record 2 is divided into words W21 and W22, with that making up record 3 being divided into words W31, W32, and W33. Record 4 consists of a single word W4. Words W21, W22, W31, W32, and W33, and Word W4 are written into data memory 12 after a chain data item and a word-discriminating data item have been added to each of these words.

Figure 8:
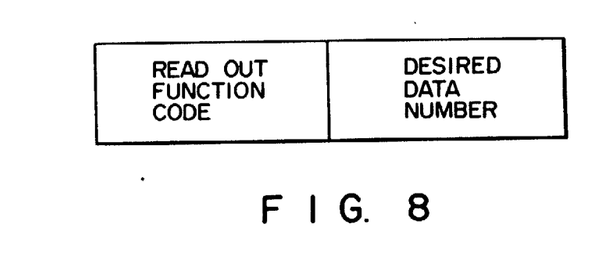
FIG. 8 shows the format of read instruction data.

In order to read a data item out of data memory 12, read instruction data having the format shown in FIG. 8 is input from card reader/writer 2 to IC card 1. This instruction data comprises a readout function code and the number of the data item to be read from memory 12. Control element 11 of IC card 1 recognizes the readout function code, whereupon it performs the sequence of operations illustrated in the flow chart of FIG. 9.

Figure 9:
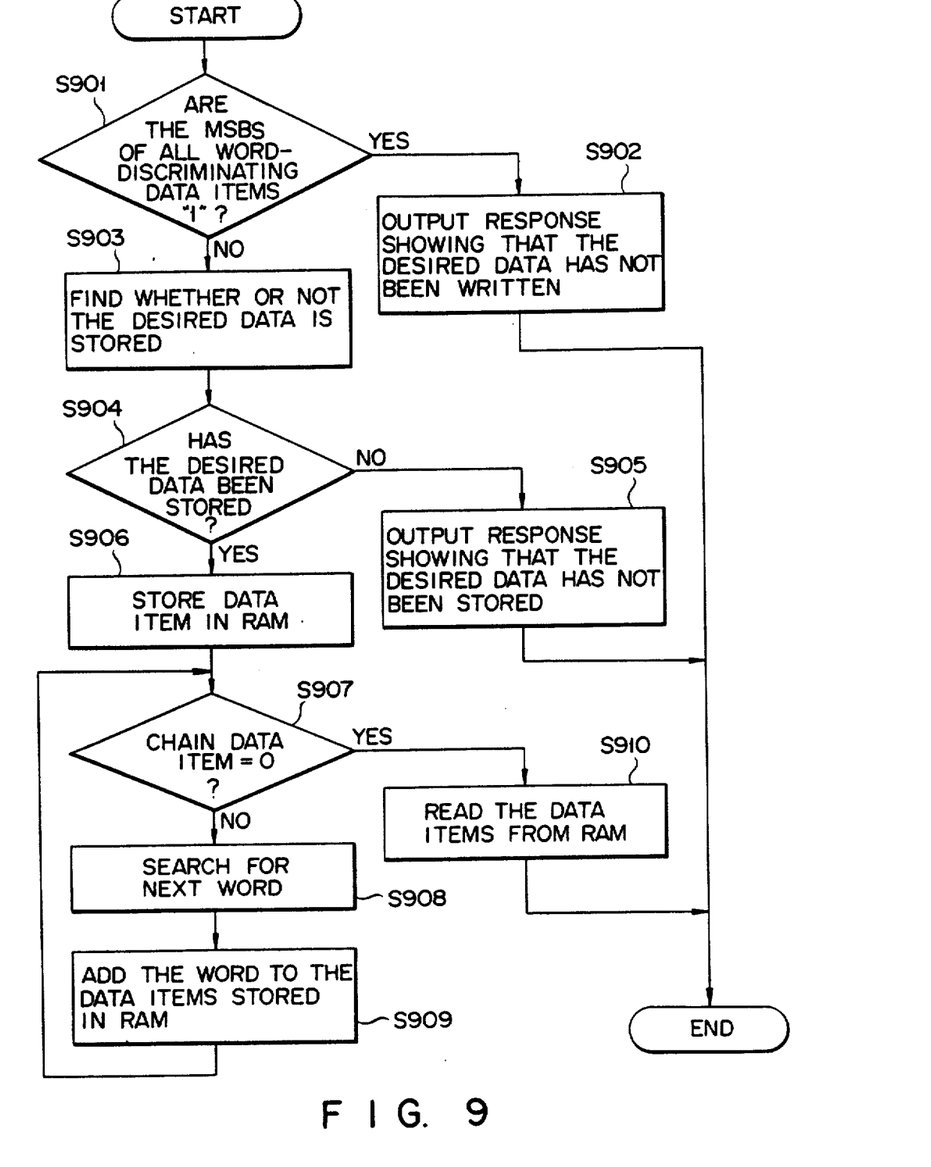
FIG. 9 is a flow chart explaining how data is read out from the data memory.

First, in step S901, control element 11 searches the storage area in which the data item desired is believed stored, to determine whether the area contains a word-discriminating data item having an MSB of "0". If NO—that is, if all the word-discriminating data items stored in this storage area are found to have an MSB of "1", control element 11 outputs, in step S902, response data indicating that the data item desired has not been written into that storage area.

If YES in step S901, control element 11 determines, in steps S903 and S904, whether or not any word forming the data item identified by the data number contained in the readout instruction data has an MSB of "0". If NO in step S904, element 11 outputs, in step S905, response data indicating that the first word of the data item desired has not been written into that storage area.

If YES in step S904, the word having an MSB of "0" is then read out, in step S906, and the data making up this word is temporarily stored in the RAM incorporated in control element 11. In the next step, S907, control element 11 determines whether or not the chain data item added to the word is "0". If NO, element 11 searches for the next word, in step S908, and in step S909, reads the data making up this word and adds it to the data stored in the RAM. If YES in step S907, control element 11 reads the data out of the RAM, in step S910; thus, the reading out of the data item desired is completed.

As has been described above, each data item is divided into a plurality of words to each of which is added a chain data item and a word-discriminating data item, and the words are then stored in a storage area of data memory 12. Since the word-discriminating data item added to the first word is set to "0", this enables the first one of the words forming any chain to be readily identified. Moreover, since the word-discriminating data item added to the last word of any chain is also set to "0", this word can then be easily identified as the last word of the chain.

As has also been described above, the chain data item, which is to be added to each word is first of all temporarily stored in the RAM, and is added to the word only when the word has been correctly written into the relevant storage area. This ensures that, in the event of the power supply to IC card 1 being accidentally cut off at the time data is being written thereinto, a chain data item will not be added to that word which is being written into the storage area at the time of power cutoff. As a result, this word will be rendered invalid and will be able to be read out from data memory 12 after the power supply to IC card 1 has been restored.

While the embodiment described above exemplifies the type of system wherein data is written into the data memory incorporated in an IC card, the invention is, nevertheless, not limited to this embodiment, and can also be applied to the case where data is stored in any other type of storage medium.

What is claimed is:

1. A data storing system having a control function for storing data together with chain data items, said data storing system comprising:

receiving means for receiving storage data to be stored, the storage data having a certain data length;

data storing means for storing the storage data received by said receiving means, said data storing means including a plurality of storage regions each for storing data having a first predetermined data length shorter than said certain data length; and control means, connected to said receiving means and said data storing means, for directing the storage data received by said receiving means into said data storing means, said control means including:

(a) data-dividing means, connected to said data receiving means, for dividing the storage data received by said receiving means into a plurality of sequential words including a first word and a last word, each word having a second predetermined data length which is shorter than said first predetermined data length, and each word, except said last word, being followed in sequence by a next word;

(b) chain data generating means, connected to said data-dividing means, for generating chain data items corresponding to said plurality of words in a one-to-one relationship, each respective chain data item identifying a unique storage region of said plurality of storage regions of said data storing means in which said next word of said plurality of words is stored, said chain data items having a specific value if said chain data items correspond to said first word or said last word; and (c) storing control means, connected to said data-dividing means, said chain data generating means, and said data storing means, for directing said plurality of words divided by said data-dividing means together with said chain data items generated by said chain data generating means, into said plurality of storage regions of said data storing means.

2. The data storing systems according to claim 1, wherein said chain data items have said specific value if said chain data items correspond to said last word of said plurality of words.

3. The data storing system according to claim 2, wherein said specific value does not represent said plurality of storage regions of said data storing means.

4. The data storing system according to claim 1, wherein:

said control means further includes:

(d) word-discriminating data generating means, connected to said data-dividing means, for generating word-discriminating data items corresponding to said plurality of words in a one-to-one relationship, said word-discriminating data items having a specified value if said word-discriminating data items correspond to said first word or said last word of said plurality of words, and said storing control means is further connected to said word-discriminating data generating means, and directs said plurality of words and said chain data items together with said word-discriminating data items generated by said word-discriminating data generating means, into said plurality of storage regions of said data storing means.

5. The data storing system according to claim 4, wherein said word-discriminating data items have said specified value if said word-discriminating items correspond to said first word of said plurality of words.

6. The data storing system according to claim 5, wherein:

each of said word-discriminating data items includes one-byte of data having a most significant bit, and said word-discriminating data items having said specified value include a predetermined logic level in the most significant bit of said one-byte of data.

7. The data storing system according to claim 6, wherein said predetermined logic level includes a "0" level.

8. The data storing system according to claim 1, wherein:

said storing control means includes:

word storing control means, connected to said data-dividing means and said data storing means, for directing said plurality of words divided by said data dividing means into said plurality of storage regions of said data storing means;

judging means, connected to said data storing means, for determining whether all of said plurality of words have been correctly stored in said plurality of storage regions of said data storing means; and adding means, connected to said chain data generating means, said judging means, and said data storing means, for adding said chain data items generated by said chain data generating means, to said plurality of words stored in said plurality of storage regions of said data storing means, when said judging means determines that all of said plurality of words have been correctly stored in said plurality of storage regions of said data storing means.

9. The data storing system according to claim 8, wherein said chain data generating means includes generating and storing means, connected to said word storing control means, for generating and storing said chain data items when said plurality of words are being stored in said plurality of storage regions of said data storing means by said word storing control means.

10. The data storing system according to claim 9, wherein:
said adding means includes:
specific value adding means, connected to said judging means and said data storing means, for adding said specific value to said last word of said plurality of words when said judging means determines that all of said plurality of words have been correctly stored in said plurality of storage regions of said data storing means; and
chain data adding means, connected to said generating and storing means and said data storing means, for adding said chain data items stored in said generating and storing means to said plurality of words stored in said plurality of storage regions of said data storing means, with the exception of said last word of said plurality of words added with said specific value by said specific value adding means, sequentially and in reverse order to that in which said plurality of words were stored in said plurality of storage regions of said data storing means.

11. A data storing system having a control function for storing data together with chain data items, said data storing system comprising:
receiving means for receiving storage data to be stored, the storage data having a certain data length;
data storing means for storing the storage data received by said receiving means, said data storing means including a plurality of storage regions, each storage region for storing data having a first predetermined data length shorter than said certain data length; and
control means, connected to said receiving means and said data storing means, for directing the storage data received by said receiving means into said data storing means, said control means including:
(a) data-dividing means, connected to said data receiving means, for dividing the storage data received by said receiving means into a plurality of sequential words including a first word and a last word, each word having a second predetermined data length which is shorter than said first predetermined length, and each word, except said last word, being followed in sequence by a next word;
(b) chain data generating means, connected to said data-dividing means, for generating chain data items corresponding to said plurality of words in a one-to-one relationship, each respective chain data item identifying a unique storage region of said plurality of storage regions of said data storing means in which said next word of said plurality of words is stored;
(c) word-discriminating data generating means, connected to said data-dividing means, for generating word-discriminating data items corresponding to said plurality of words divided by said data-dividing means in a one-to-one relationship, each respective word-discriminating data item of said word-discriminating data items indicating whether said respective word-discriminating data item corresponds to said first word or said last word of said plurality of words; and
(d) storing control means, connected to said data-dividing means, said chain data generating means, said word-discriminating data generating means, and said data storing means, for directing said plurality of words divided by said data-dividing means, together with said chain data items generated by said chain data generating means and said word-discriminating data items generated by said word-discriminating data generating means, into said plurality of storage regions of said data storing means.

12. The data storing systems according to claim 11, wherein said respective word-discriminating data item has a specified value if said word-discriminating data item corresponds to said first word of said plurality of words.

13. The data storing system according to claim 12, wherein:
each of said word-discriminating data items includes one-byte of data having a most significant bit, and
said respective word-discriminating data item having said specified value includes a predetermined logic level in the most significant bit of said one-byte of data.

14. The data storing system according to claim 13, wherein said predetermined logic level includes a "0" level.

15. The data storing system according to claim 11, wherein:
said storing control means includes:
word storing control means, connected to said data-dividing means and said data storing means, for directing said plurality of words divided by said data-dividing means into said plurality of storage regions of said data storing means;
judging means, connected to said data storing means, for determining whether all of said plurality of words have been correcting stored in said plurality of storage regions of said data storing means; and
adding means, connected to said chain data generating means, said judging means, and said data storing means, for adding said chain data items generated by said chain data generating means, to said plurality of words stored in said plurality of storage regions of said data storing means, when said judging means determines that all of said plurality of words have been correctly stored in said plurality of storage regions of said data storing means.

16. The data storing system according to claim 15, wherein said chain data generating means includes generating and storing means, connected to said word storing control means, for generating and storing said chain data items when said plurality of words are stored in said plurality of storage regions of said data storing means by said word storing control means.

17. The data storing system according to claim 16, wherein:
said adding means includes:
specific value adding means, connected to said judging means and said data storing means, for adding a specific value to said last word of said plurality of words when said judging means determines that all of said plurality of words have been correctly stored in said plurality of storage regions of said data storing means; and
chain data adding means, connected to said generating and storing means and said data storing means, for adding said chain data items stored in said generating and storing means to said plurality of words stored in said plurality of storage regions of said data storing means, with the exception of said last word of said plurality of words added with specific value by said specific value adding means, sequentially and in reverse order to that in which said plurality of words were stored in said plurality of storage regions of said data storing means.

18. A portable electric apparatus for storing and reading data in accordance with a command from an external terminal device, said portable electronic apparatus comprising:
receiving means for receiving the command and storage data to be stored from the external terminal device, the storage data having a certain data length;
data storing means for storing the storage data received by said receiving means, said data storing means including a plurality of storage regions, each storage region for storing data having a first predetermined data length shorter than said certain data length; and
control means, connected to said receiving means and said data storing means, for directing the storage data received by said receiving means into said data storing means in accordance with the command received by said receiving means, said control means including:
(a) data-dividing means, connected to said data receiving means, for dividing the storage data received by said receiving means into a plurality of sequential words including a first word and a last word, each word having a second predetermined data length which is shorter than said first predetermined data length, and each word, except said last word, being followed in sequence by a next word;

(b) chain data generating means, connected to said data-dividing means, for generating chain data items corresponding to said plurality of words in a one-to-one relationship, each respective chain data item identifying a unique storage region of said plurality of storage regions of said data storing means in which said next word of said plurality of words is stored;
(c) word storing control means, connected to said data-dividing means and said data storing means, for directing said plurality of words divided by said data-dividing means into said plurality of storage regions of said data storing means;
(d) judging means, connected to said data storing means, for determining whether all of said plurality of words have been correctly stored in said plurality of storage regions of said data storing means; and
(e) adding means, connected to said chain data generating means, said judging means, and said data storing means, for adding said chain data items generated by said chain data generating means, to said plurality of words stored in said plurality of storage regions of said data storing means, when said judging means determines that all of said plurality of words have been correctly stored in said plurality of storage regions of said data storing means.

19. The apparatus according to claim 18, wherein said chain data generating means includes generating and storing means, connected to said word storing control means, for generating and storing said chain data items when said plurality of words are stored in said plurality of storage regions of said data storing means by said word storing control means.

20. The apparatus according to claim 19, wherein:
said adding means includes:
specific value adding means, connected to said judging means and said data storing means, for adding a specific value to said last word of said plurality of words when said judging means determines that all of said plurality of words have been correctly stored in said plurality of storage regions of said data storing means; and
chain data adding means, connected to said generating and storing means and said data storing means, for adding said chain data items stored in said generating and storing means to said plurality of words stored in said plurality of storage regions of said data storing means, with the exception of said last word of said plurality of words added with said specific value by said specific value adding means, sequentially and in reverse order to that in which said plurality of words were stored in said plurality of storage regions of said data storing means.

* * * * *